(12) United States Patent
Burtch et al.

(10) Patent No.: US 11,827,147 B2
(45) Date of Patent: Nov. 28, 2023

(54) OBSTACLE DETECTION FOR TRAILER OPERATION

(71) Applicant: Continental Autonomous Mobility US, LLC, Auburn Hills, MI (US)

(72) Inventors: Joseph Burtch, Lake Orion, MI (US); Nizar Ahamed, Farmington Hills, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 0 days.

(21) Appl. No.: 17/653,407

(22) Filed: Mar. 3, 2022

(65) Prior Publication Data
US 2023/0278493 A1    Sep. 7, 2023

(51) Int. Cl.
*B60Q 9/00*    (2006.01)
*G08G 1/16*    (2006.01)

(52) U.S. Cl.
CPC .............. *B60Q 9/008* (2013.01); *G08G 1/16* (2013.01)

(58) Field of Classification Search
None
See application file for complete search history.

(56) References Cited

U.S. PATENT DOCUMENTS

| | | | |
|---|---|---|---|
| 8,223,204 B2 | 7/2012 | Hahn | |
| 11,605,295 B2* | 3/2023 | Niewiadomski | G08G 1/16 |
| 2005/0117364 A1* | 6/2005 | Rennick | B60Q 1/34 |
| | | | 362/540 |
| 2010/0106356 A1* | 4/2010 | Trepagnier | G05D 1/0248 |
| | | | 701/25 |
| 2013/0158863 A1 | 6/2013 | Skvarce | |
| 2014/0172239 A1* | 6/2014 | Vergara | B60Q 9/008 |
| | | | 701/49 |
| 2014/0222288 A1 | 8/2014 | Lavoie | |
| 2014/0303847 A1 | 10/2014 | Lavoie | |
| 2014/0358429 A1 | 12/2014 | Shutko et al. | |
| 2016/0297432 A1 | 10/2016 | Fletcher | |
| 2017/0057413 A1* | 3/2017 | Shehan | G01S 17/931 |
| 2017/0363727 A1* | 12/2017 | Prasad | B60W 40/12 |
| 2020/0372802 A1* | 11/2020 | Kim | G01S 15/931 |
| 2022/0230544 A1* | 7/2022 | Niewiadomski | B62D 15/0295 |
| 2023/0192131 A1 | 6/2023 | Burtch et al. | |

FOREIGN PATENT DOCUMENTS

DE    102015109537 A1    12/2015

OTHER PUBLICATIONS

The International Search Report and the Written Opinion of the International Searching Authority dated Aug. 7, 2023 for the counterpart PCT Application No. PCT/US2023/063455.

* cited by examiner

*Primary Examiner* — Muhammad Adnan

(57) ABSTRACT

A trailer maneuver assistance system and method provide for alerting a vehicle operator to possible obstacles within a predicted path of trailer. The predicted path is determined based on at least one sensor system mounted to the trailer and a determination that a detected obstacle is within the predicted path.

20 Claims, 2 Drawing Sheets

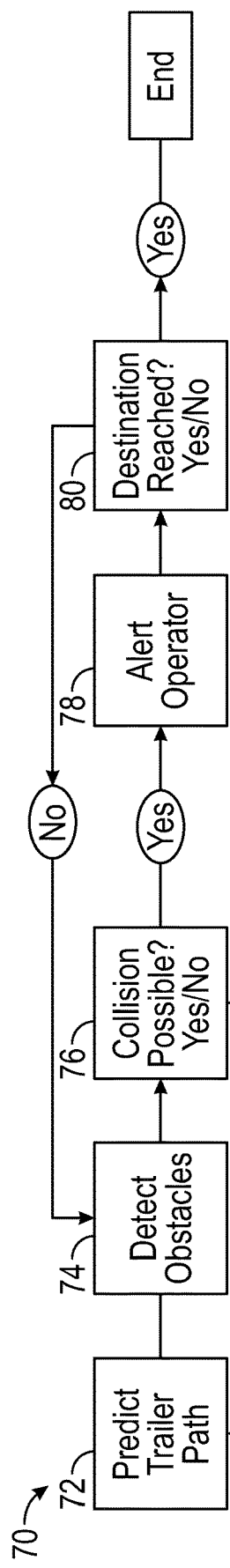

OBSTACLE DETECTION FOR TRAILER OPERATION

TECHNICAL FIELD

The present disclosure relates to a method and system for assisting driver operation during low speed maneuvers with a trailer.

BACKGROUND

Automated driving and driver assist systems gather information about an environment surrounding a vehicle and use that information to plan movement to a desired destination. Maneuvering a trailer in reverse and at low speeds in tight spaces is challenging to a vehicle operator. Some systems aid in steering a trailer but may not provide information about objects around the trailer that are blocked from view by the vehicle operator. Automotive manufactures are continuously seeking features to improve safety and customer satisfaction.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method of assisting maneuvering of a trailer according to one disclosed example embodiment includes, among other possible things, predicting a path of a trailer based on vehicle and trailer odometry, detecting an obstacle within the predicted path with at least one trailer sensor system mounted on the trailer, and actuating an alert device of a tow vehicle to communicate the presence of the detected obstacle to a vehicle operator.

Another embodiment of the foregoing method further includes detecting the obstacle with at least one tow vehicle sensor system in addition to the at least one trailer sensor system.

In another embodiment of any of the foregoing methods, detecting the obstacle further includes defining a clearance distance around the detected obstacle and determining that the obstacle is within the predicted path in response to the predicted path extending through the defined clearance distance.

Another embodiment of any of the foregoing methods, further includes assigning a clearance distance for the trailer relative to the predicted path and detecting a conflict at a point along the predicted path responsive to a distance between the obstacle and the predicted path being less than the assigned clearance distance.

In another embodiment of any of the foregoing methods, the clearance distance comprises a circle centered on a point along the predicted path.

In another embodiment of any of the foregoing methods, the circle includes a diameter greater than a width of the trailer.

In another embodiment of any of the foregoing methods, the at least one trailer sensor comprises at least one trailer camera mounted to the trailer, wherein the camera is in communication with a controller of the tow vehicle.

In another embodiment of any of the foregoing methods, the at least one tow vehicle sensor comprises at least one tow vehicle camera.

In another embodiment of any of the foregoing methods, the alert device comprises a sound generating device that produces an audible alert sound within a cabin of the tow vehicle.

In another embodiment of any of the foregoing methods, the alert device comprises a display within a cabin of the tow vehicle that generates an image indicating possible contact with the detected obstacle.

In another embodiment of any of the foregoing methods, the alert device comprises a haptic device that generates a physical sensation responsive to possible contact with the detected obstacle.

In another embodiment of any of the foregoing methods, the haptic device comprises one of a steering wheel or a drives seat of the tow vehicle.

In another embodiment of any of the foregoing methods, the haptic device comprises an active-force-feedback pedal system of the tow vehicle.

Another embodiment of any of the foregoing methods, further includes determining free space surrounding the trailer and predicting the path of the trailer based on the determined free space.

A trailer maneuver assistance system according to another disclosed example embodiment includes a controller coupled to a tow vehicle alert system and at least one sensor mounted to a trailer, the controller being configured to predict a path of a trailer based on vehicle and trailer odometry, detect an obstacle within the predicted path with at least one trailer sensor system mounted on the trailer, and actuate an alert device to communicate the presence of the detected obstacle to a vehicle operator, and at least one alert device in communication with the controller and configured to communicate possible contact to a tow vehicle operator responsive to detecting the obstacle within the predicted path.

In another embodiment of the foregoing trailer maneuver assistance system, the at least one sensor mounted on the trailer comprises at least one trailer camera and the tow vehicle includes at least one trailer camera with both the at least one trailer camera and the at least one tow vehicle camera configured to send images to the controller.

In another embodiment of the foregoing trailer maneuver assistance system, the at least one alert device comprises one of a sound producing device, a display device and a haptic device.

In another embodiment of the foregoing trailer maneuver assistance system, the controller if further configured to assign a clearance distance and detect a conflict at a point along the predicted path responsive to a distance between the obstacle and the predicted path being less than the assigned clearance distance.

A non-transitory computer readable storage medium including instructions for operating a vehicle control system to assist maneuvering of a trailer according to another disclosed example embodiment includes instructions prompting a controller to predict a path of a trailer based on vehicle and trailer odometry, detect an obstacle within the predicted path with at least one trailer sensor system mounted on the trailer, and actuate an alert device to communicate the presence of the detected obstacle to a vehicle operator.

Another embodiment of the foregoing non-transitory computer readable storage medium further includes instructions prompting the controller to assign a clearance distance and detect a conflict at a point along the predicted path responsive to a distance between the obstacle and the predicted path being less than the assigned clearance distance.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

FIG. 2 is a flow diagram of steps performed according one example system embodiment.

FIG. 3 is a schematic view of a trailer moving along a path.

FIG. 4 is a schematic view of a trailer being maneuvered around a detected obstacle.

FIG. 5 is a schematic view of a tow vehicle and trailer maneuvered around the detected objection.

FIG. 6 is a schematic view of the tow vehicle and trailer at a final destination.

DETAILED DESCRIPTION

Figure 1:
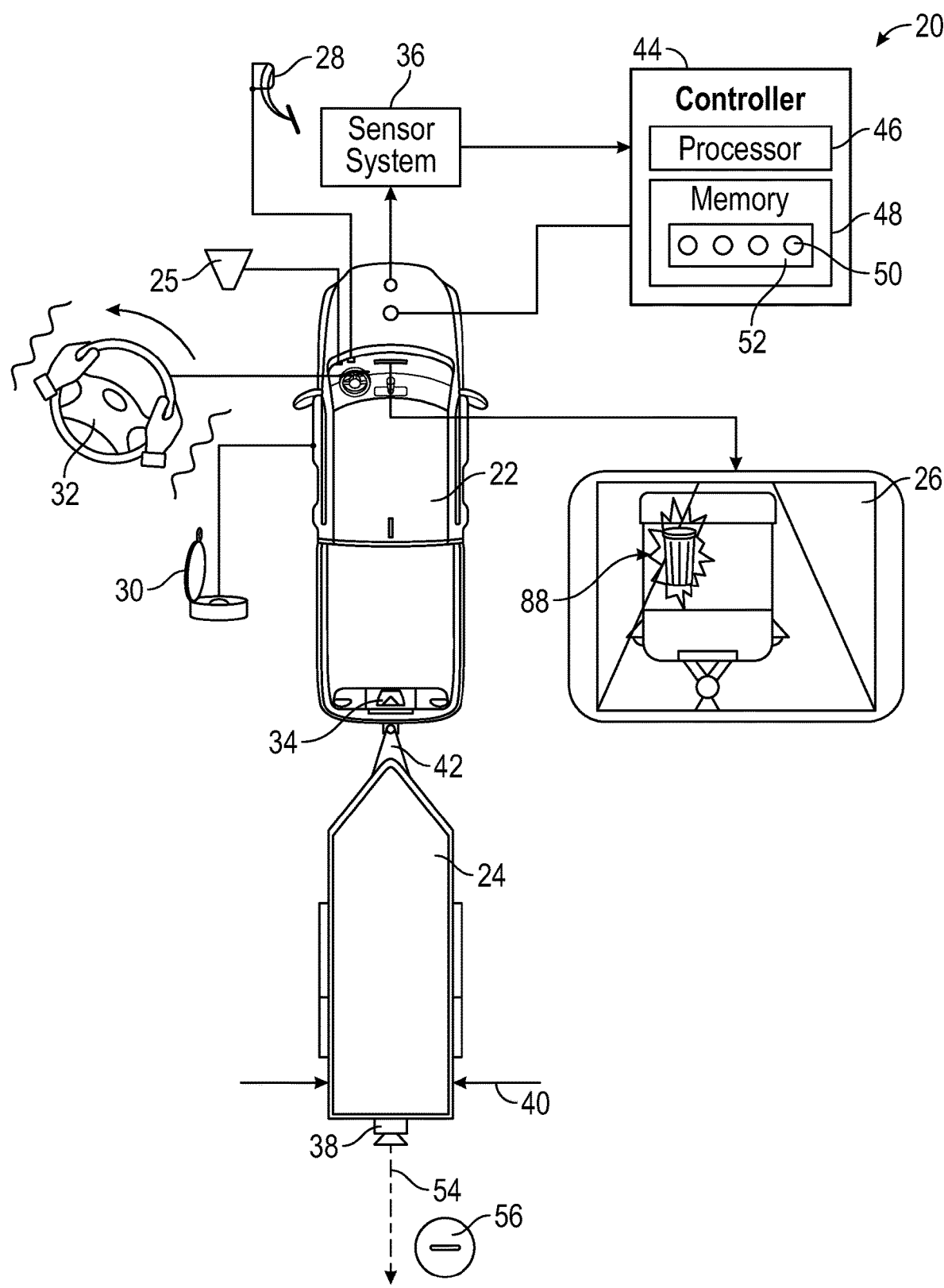
FIG. 1 is a schematic view of a disclosed example system for assisting in maneuvering a trailer.

Referring to FIG. 1, a vehicle control system 20 for assisting a vehicle operator in maneuvering a trailer 24 provides information utilized to avoid detected obstacles. A tow vehicle 22 is show coupled to the trailer 24 by way of a coupling 42. Maneuvering of a trailer, especially along a reversing path is challenging to a vehicle operator and requires great skill. Most vehicle operators do not tow a trailer on a regular basis and therefore any system that aids operation is welcome. Moreover, although systems for steering a reversing trailer ease operation, such systems may not provide for detection of obstacles not readily visible to a tow vehicle operator.

A disclosed example embodiment of the control system 20 operates by predicting a path 54 of the trailer based on vehicle and trailer odometry and detecting an obstacle 56 within the predicted path 54 with at least one trailer sensor system mounted on the trailer 24. In the disclosed example embodiment, the trailer 24 includes a camera 38 that provides images to a tow vehicle controller 44 of the area proximate a rear of the trailer 24. The images are utilized to detect obstacles, such as the trash can 56 along the path 54. Upon detection of an obstacle, the system 20 actuates an alert device to communicate the presence of the obstacle to the vehicle operator so that the operator may modify the path as necessary to avoid the obstacle.

In one disclosed example, the system 20 is embodied as a controller 44 of the tow vehicle that operates to execute software instructions 50 stored in a memory device 48 or a computer readable medium 52.

The example controller 44 may be a separate controller dedicated to the control system 20 are may be part of an overall vehicle controller. Accordingly, the example controller 44 relates to a device and system for performing necessary computing or calculation operations of the control system 20. The controller 44 may be specially constructed for operation of the control system 20, or it may comprise at least a general-purpose computer selectively activated or reconfigured by the software instructions 50 stored in the memory device 48. The computing system can also consist of a network of (different) processors 30.

The example vehicle controller 44 includes the processor 46 and the memory device 48. The memory device 48 provides for the storage of the software instructions 50 that prompt operation of the processor 46 and system 20. The software instructions 50 may be embodied in a computer program that uses data stored in the memory device 48 that may be required for its execution.

The instructions 50 for configuring and operating the controller 44, control system 20 and the processor 46 are embodied in software instructions that may be stored on a computer readable medium, schematically shown at 52. The computer readable medium 52 may be embodied in structures such as, but is not limited to, any type of disk including floppy disks, optical disks, CD-ROMs, magnetic-optical disks, read-only memories (ROMs), random access memories (RAMS), EPROMs, EEPROMs, magnetic or optical cards, application specific integrated circuits (ASICs), or any type of media suitable for storing electronic instructions, and each coupled to a computer system bus. The disclosed computer readable medium may be a non-transitory medium such as those examples provided.

Moreover, the disclosed memory device 48, may can include any one or combination of volatile memory elements (e.g., random access memory (RAM, such as DRAM, SRAM, SDRAM, VRAM, etc.) and/or nonvolatile memory elements (e.g., ROM, hard drive, tape, CD-ROM, etc.). The software instructions 50 in the memory device 48 may include one or more separate programs, each of which includes an ordered listing of executable instructions for implementing logical functions. The disclosed controller 44 is configured to execute the software instructions 50 stored within the memory device 48, to communicate data to and from the memory device 48, and to generally control operations pursuant to the software. Software in memory, in whole or in part, is read by the processor 46, perhaps buffered within the processor, and then executed.

The tow vehicle 22 includes a sensor system 36 that is in communication with the controller 44. The sensor system 36 provides information indicative of an orientation, location, speed and direction of the vehicle 22. The sensor system further provides information that is used to determine an orientation between the vehicle 22 and the trailer 24 that is utilized to predict the path 54. The sensor system 36 may include any sensor systems utilized to provide information on vehicle operation and that may be used to provide information to the controller 44 regarding vehicle odometry. The sensor system 36 may include radar, lidar, an inertial measurement unit (IMU), brake sensors, steering sensors, accelerometers, GPS and any other system known to provide information regarding operation.

The tow vehicle 22 includes various alert devices that communicate information to the vehicle operator. The alert devices can include a display 26, a sound generating device such as speaker 25 as well as force feedback and haptic feedback systems. In one example embodiment, a steering wheel 32 and seat 30 are provided with haptic feedback systems to communicate information to the vehicle operator. Additionally, the tow vehicle 22 may be equipped with an active-force feedback-pedal system 28. It should be appreciated that although several alert systems are disclosed by way of example, other alert systems could be utilized and are within the scope and contemplation of this disclosure.

Referring to FIGS. 2 and 3, with continued reference to FIG. 1, a flow diagram illustrating an example control system operation embodiment is generally indicated at 70 (FIG. 2). Operation is initiated by predicting a path 54 of the trailer 24 and tow vehicle 22 as indicated at 72 in the flow diagram 70. The example system is to assist operation by a vehicle operator and therefore, the path 54 is not predefined, but is instead a predicted path based on a starting point 58 and a potential end point 60. The prediction of the potential path 54 may be performed utilizing known techniques to approximate free space including, for example, semantic segmentation and structure-from-motion approximations. It should be appreciated, that other prediction techniques to determine a potential path may be also be utilized and are within the scope and contemplation of this disclosure.

A clearance distance indicated by circles 62 around points of the predicted path are defined. In the disclosed example the clearance distance 62 is shown as a circle, but other shapes could also be utilized. Moreover, in this example, the clearance distance 62 is a circle centered on the path 54 with a diameter 82 equal to or greater than a width 40 of the trailer 24. Because the diameter 82 is equal to or greater than the trailer width 40, if the clearance circle 62 does not intersect an obstacle, no interference should occur.

The trailer camera 38 and the vehicle camera 34 are used to detect obstacles such as the trash can 56 proximate the path 54 as indicated at 74 in the flow diagram. The determination that the obstacle 56 presents a collision risk is based on the clearance circles 62 intersecting any portion of the obstacle 56. In this example, an intersection points 86 indicate a collision is possible. An affirmative determination of a possible collision as indicated at 76 causes the engagement of an alert to the operator as indicated at 78. A negative determination reengages the process of predicting the trailer path 54.

Alerting of the vehicle operator may include a visual indication 88 on the display 26 as shown in FIG. 1. The visual indication 88 may take any form to communicate the possibility of a contact. The visual indication may be shadow regions as is schematically shown at 90 in FIG. 3. As appreciated, the visual indication on the display 26 may take many different forms within the scope and contemplation of this disclosure.

The alert may also be in the form of an audible sound produce by the speaker 25. Such audible sounds may speed up or slow down based on proximity to the obstacle or any other sequence of sounds that would be understood to communicate proximity to a vehicle operator.

The alert may also be in the form a haptic response initiated by actuators coupled to the steering wheel 32 or the driver seat 30. In either application, the force feedback would alert the vehicle operator of the obstacle. The force feedback in the steering wheel 32 may prompt a direction to correct the path 54 and avoid the object.

The alert may also be in the form actuation of a pedal system 28 to apply brakes independent of the vehicle operator to prevent contact. In this example, the pedal system 28 may actuate in response to the determination of possible contact. It should be understood that although several example alert devices are disclosed by way of example, other alert systems could be utilized within the scope and contemplation of this disclosure.

Additionally, in some instances, maneuvering around the obstacle may not be possible within currently defined drivable space. In such circumstances, the alert will communicate to the operator that no path around the obstacle 64 is possible. The operator would be prompted in such circumstances to pull forward and start the reversing maneuver over, seek an alternate rout and/or remove the obstacle if possible. Moreover, other options may be presented when the obstacle 64 is present in a position that does not accommodate avoidance maneuvers to get around the obstacle.

Referring to FIG. 4 with continued reference to FIGS. 1-3, upon an alert to the vehicle operator, the trailer 24 is steered around the 56. The display 26 may provide a live view of the area behind the trailer 24 to provide the vehicle operator the information and view necessary to alter the path 54. As the trailer 24 is maneuvered past the obstacle 56, the predicted path 54 is continually updated and the clearance circles 62 updated.

Referring to FIG. 5, in another disclosed embodiment an obstacle clearance 64 is defined around the obstacle 56 to further aid in maneuvering the trailer 24 and tow vehicle 22. In the example disclosed in FIG. 5, the clearance circle 64 would be modified to assure a clearance of the tow vehicle 22 as it proceeds around and away from the obstacle.

Referring to FIG. 6, with continued reference to FIGS. 1 and 2, the disclosed system 20 continually predicts the path 54 and looks for obstacles based on information provided regarding the surrounding environment. At each iteration, the system determines if the maneuver is completed as indicated at 80 in the flow diagram 70. If the maneuver is complete and the trailer 24 is at the end point 60, the system 20 will discontinue monitoring. Upon further movement, the system 20 will reengage and continue updating the predicted path 54 and alerting the operator to any obstacles along the path 54.

Although an obstacle 56 within the predicted path 54 is disclosed by way of example, the disclosed system 20 is also operable to keep the trailer 24 on a defined drivable area. An intersection of the clearance circles 62 with edges of a defined drivable area would prompt an alert to the vehicle operator. The vehicle operator would then maneuver the tow vehicle 22 and trailer 24 to keep the trailer within the defined drivable area.

Accordingly, the disclosed example control system embodiments provide alerts to a tow vehicle operator to assist in avoiding obstacles and maintaining a trailer along a desired path.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of assisting maneuvering of a trailer comprising:
predicting a path of a trailer based on vehicle and trailer odonnetry;

detecting an obstacle within the predicted path with at least one trailer sensor system mounted on the trailer;
actuating an alert device of a tow vehicle to communicate the presence of the detected obstacle to a vehicle operator; and
assigning a clearance distance for the trailer relative to the predicted path and detecting a conflict at a point along the predicted path responsive to a distance between the obstacle and the predicted path being less than the assigned clearance distance, wherein the clearance distance comprises at least one circle centered on a point along the predicted path, each of the at least one circle includes a dia meter greater than a width of the trailer and is modified while maneuvering the trailer,
wherein the alert device comprises a display within a cabin of the tow vehicle generating an image indicating possible contact with the detected obstacle, the image indicating possible contact comprises at least one shadow region in the image between a representation of the trailer and a representation of the detected obstacle in the image.

2. The method as recited in claim 1, further including detecting the obstacle with at least one tow vehicle sensor system in addition to the at least one trailer sensor system.

3. The method as recited in claim 1, wherein detecting the obstacle further includes defining a clearance distance around the detected obstacle and determining that the obstacle is within the predicted path in response to the predicted path extending through the defined clearance distance.

4. The method as recited in claim 1, wherein the at least one trailer sensor comprises at least one trailer camera mounted to the trailer, wherein the camera is in communication with a controller of the tow vehicle.

5. The method as recited in claim 2, wherein the at least one tow vehicle sensor comprises at least one tow vehicle camera.

6. The method as recited in claim 1, wherein the alert device further comprises a sound generating device that produces an audible alert sound within a cabin of the tow vehicle.

7. The method as recited in claim 1, wherein the alert device further comprises a haptic device that generates a physical sensation responsive to possible contact with the detected obstacle.

8. The method as recited in claim 7, wherein the haptic device is integrated into one of a steering wheel or a driver seat of the tow vehicle.

9. The method as recited in claim 7, wherein the haptic device is integrated into an active-force-feedback pedal system of the tow vehicle.

10. The method as recited in claim 1, further comprising determining free space surrounding the trailer and predicting the path of the trailer based on the determined free space.

11. The method as recited in claim 1, wherein the at least one circle comprises a plurality of circles, each circle having a center along the predicted path, and each circle is modified while maneuvering the trailer.

12. The method as recited in claim 1, wherein the at least one shadow region covers at least part of the at least one circle in the image.

13. A trailer maneuver assistance system comprising:
a controller coupled to a tow vehicle alert system and at least one sensor mounted to a trailer, the controller being configured to predict a path of a trailer based on vehicle and trailer odometry, detect an obstacle within the predicted path with at least one trailer sensor system mounted on the trailer, and actuate an alert device to communicate the presence of the detected obstacle to a vehicle operator; and
at least one alert device in communication with the controller and configured to communicate possible contact to a tow vehicle operator responsive to detecting the obstacle within the predicted path,
wherein the controller is further configured to assign a clearance distance and detect a conflict at a point along the predicted path responsive to a distance between the obstacle and the predicted path being less than the assigned clearance distance, wherein the clearance distance comprises at least one circle centered on a point along the predicted path, the at least one circle includes a diameter greater than a width of the trailer and is updated while maneuvering the trailer,
wherein the at least one alert device comprises a display within a cabin of the tow vehicle generating an image indicating possible contact with the detected obstacle, the image indicating possible contact comprises at least one shadow region in the image between a representation of the trailer and a representation of the detected obstacle in the image.

14. The trailer maneuver assistance system as recited in claim 13, wherein the at least one sensor mounted on the trailer comprises at least one trailer camera and the tow vehicle includes at least one trailer camera with both the at least one trailer camera and the at least one tow vehicle camera configured to send images to the controller.

15. The trailer maneuver assistance system as recited in claim 13, wherein the at least one alert device further comprises one of a sound producing device or a haptic device.

16. The trailer maneuver assistance system as recited in claim 13, wherein the at least one circle comprises a plurality of circles, each circle having a center along the predicted path, and each circle is updated while maneuvering the trailer.

17. The trailer maneuver assistance system as recited in claim 13, wherein the at least one shadow region covers at least part of the at least one circle in the image.

18. A non-transitory computer readable storage medium including instructions for operating a vehicle control system to assist maneuvering of a trailer, the computer readable storage medium including instructions prompting a controller to
predict a path of a trailer based on vehicle and trailer odometry;
detect an obstacle within the predicted path with at least one trailer sensor system mounted on the trailer; and
actuate an alert device to communicate the presence of the detected obstacle to a vehicle operator,
wherein detecting the obstacle further includes defining a clearance distance around the detected obstacle and determining that the obstacle is within the predicted path in response to the predicted path extending through the defined clearance distance, and wherein the clearance distance comprises at least one circle having a center at a point along the predicted path, the at least one circle has a diameter and is modified by the vehicle control system while maneuvering the trailer,
wherein the alert device comprises a display within a cabin of a tow vehicle generating an image indicating possible contact with the detected obstacle, the image indicating possible contact comprises at least one shadow region in the image between a representation of the trailer and a representation of the detected obstacle in the image.

19. The non-transitory computer readable storage medium as recited in claim 18, wherein the at least one circle comprises a plurality of circles, each circle having a center along the predicted path, and each circle is modified while maneuvering the trailer.

20. The non-transitory computer readable storage medium as recited in claim 18, wherein the at least one shadow region covers at least part of the at least one circle in the image.

* * * * *